April 29, 1924.
W. F. MARCH
1,492,382
AUTOMOBILE BRAKE HOLDER AND ADJUSTER
Filed May 3, 1923
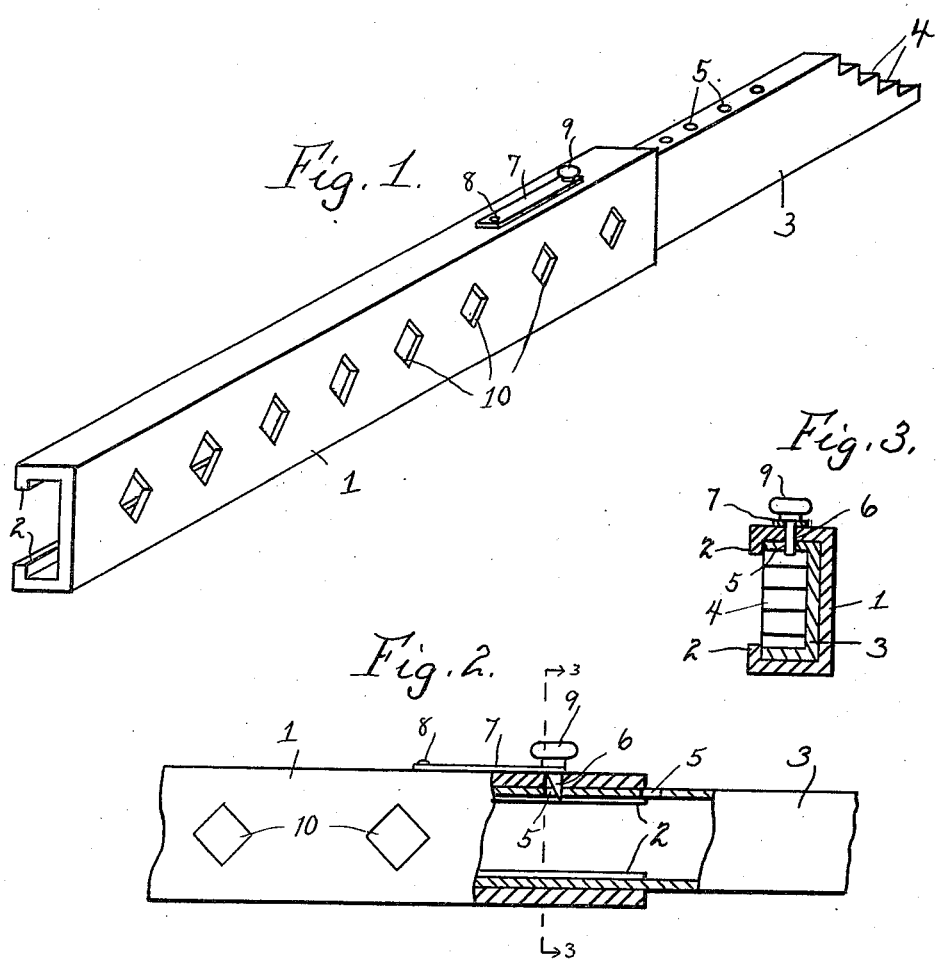
INVENTOR
William Frank March
By W. W. Williamson
Atty.

Patented Apr. 29, 1924.

1,492,382

UNITED STATES PATENT OFFICE.

WILLIAM FRANK MARCH, OF PHILADELPHIA, PENNSYLVANIA.

AUTOMOBILE BRAKE HOLDER AND ADJUSTER.

Application filed May 3, 1923. Serial No. 636,356.

*To all whom it may concern:*

Be it known that I, WILLIAM FRANK MARCH, a citizen of the United States, residing at Philadelphia, in the county of Philadelphia and State of Pennsylvania, have invented new and useful Improvements in Automobile Brake Holders and Adjusters, of which the following is a specification.

My invention relates to a new and useful improvement in automobile brake holders and adjusters, and has for its object to provide an exceedingly simple and effective device of this description which may be readily applied to the operating lever of a brake so as to hold said lever in proper position while the brake bands are being adjusted, thus enabling the equalizing of these brake bands so that they will take proper hold in unison when the brake lever is operated by the driver of the machine.

A further object of my invention is to so construct the device that the members thereof may be readily telescoped or as readily extended and be automatically locked when in the desired adjustment.

A still further object of my invention is to so construct the device that it may be made of sheet metal or casting.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawing forming a part of this application, in which:—

Fig. 1, is a perspective of my improved device.

Fig. 2, is a side elevation of a portion of the device partly broken away and sectioned to clearly show the locking mechanism.

Fig. 3, is a section at the line 3—3 of Fig. 2.

In carrying out my invention as here embodied, 1 represents a casing which may be made of sheet metal so bent as to form a guideway therein lengthwise thereof by means of the inturned flanges 2 and 3 represents the adjusting member which is adapted to slide within said casing and this adjusting member has formed upon its outer end a series of steps 4 for engagement with the foot brake lever of an automobile, thus providing a limited amount of adjustment of said lever by putting one or the other of the steps into engagement with said brake lever.

In order that the adjusting member may be readily formed from sheet metal or cast it is here shown as U shaped in cross section and has formed in the upper flange thereof a series of holes 5 with which the latch 6 is adapted to engage and this latch is secured to a plate spring 7, the latter being secured to the casing by a rivet or screw 8.

9 represents a thumb knob carried by the latch for the proper manipulation of said lever.

In practice one of the steps 4 is engaged with the foot brake lever of the automobile and the device extended so as to give the proper length thereto, the spring actuated latch riding over the holes on account of its nose being beveled in one direction for this purpose and when the proper length has been attained the outer end of the casing 1 is jammed against the front of the seat of the machine so as to hold the brake lever in the desired position for adjusting the brake bands.

When the operation of adjusting the brake bands has been accomplished the device may be readily removed by withdrawing the latch 6 from engagement with the adjusting member, the latter may be telescoped within the casing and there held by the reengagement of the latch with the end hole, thus bringing the device into compact form for accommodation in the tool box.

A series of openings 10 may be punched or cast in the casing to reduce the weight of the device and at the same time give a certain amount of ornamentation.

By the old method it has required the services of two persons to equalize and adjust the brake bands of an automobile, one to hold the brake lever while the other adjusted the bands, and under this method accuracy of adjustment was seldom accomplished on account of lack of uniformity in the holding of the brake lever while the adjustment was being made, but by the use of my improvement the brake lever is held positively in a predetermined positioned so that a single person may adjust the brake bands with great accuracy.

Of course I do not wish to be limited to the exact details of construction as herein shown as these may be varied within the limits of the appended claims without departing from the spirit of my invention.

Having thus fully described my invention, what I claim as new and useful is:—

1. In an automobile brake holder and adjuster, the combination of a casing having a guideway therein, an adjusting member adapted to slide within said guideway having a series of holes along its upper edge, and a spring actuated latch adapted to engage said holes for holding the adjusting member in a predetermined position, there being a series of steps formed upon the outer end of the adjusting member.

2. In a device of the character described, a metal casing U shaped in cross section having inturned flanges to form a guideway therein, an adjusting member also U shaped in cross section adapted to slide within said guideway, the upper flange of said adjusting member having a series of holes formed therein, a latch beveled in one direction adapted to engage the holes, a plate spring carrying said latch, said spring being secured to the casing, and a thumb knob for manipulating the latch.

3. The herein described combination of a U shaped metal casing, a U shaped metal adjusting member adapted to slide within said casing, there being steps formed upon the outer end of the adjusting member, and means for locking the adjusting member at any predetermined adjustment within the casing.

In testimony whereof, I have hereunto affixed my signature.

WILLIAM FRANK MARCH.